June 13, 1972  F. C. MOORE  3,669,786
METHOD OF LAMINATING PLASTIC FOAM
Filed Feb. 19, 1970
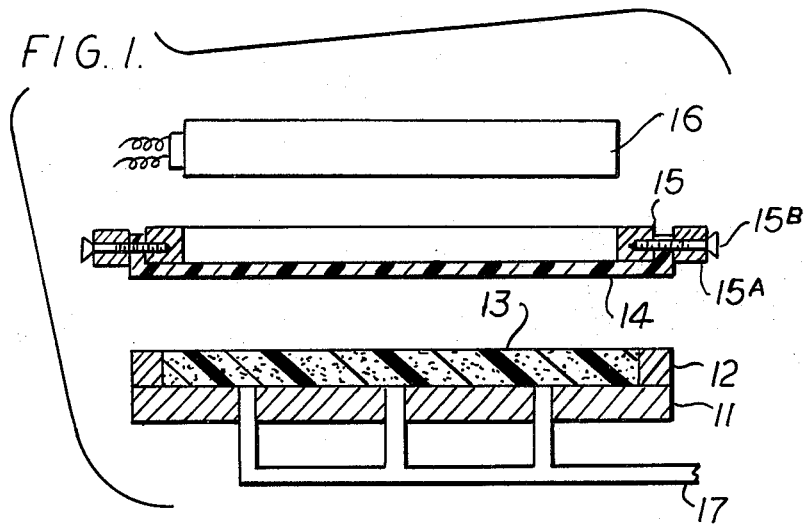
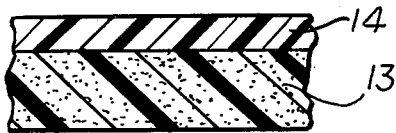
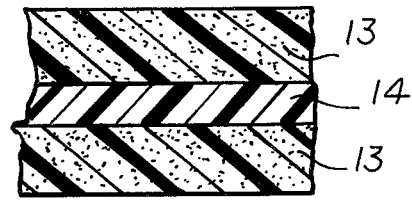
INVENTOR
FRANCIS C. MOORE
BY: Dawson, Tilton, Fallon & Lungmus
ATTY'S

United States Patent Office 3,669,786
Patented June 13, 1972

3,669,786
METHOD OF LAMINATING PLASTIC FOAM
Francis C. Moore, 3935 Arthington Blvd.,
Indianapolis, Ind. 46226
Continuation-in-part of application Ser. No. 583,469,
Sept. 30, 1966. This application Feb. 19, 1970, Ser.
No. 12,708
Int. Cl. B29c 17/03
U.S. Cl. 156—163
11 Claims

ABSTRACT OF THE DISCLOSURE

Laminating a plastic foam to a surface-treated polyolefin film by heating the film to a temperature approximating or slightly exceeding its disorientation temperature and thereafter contacting the film and foam.

---

This application is a continuation-in-part of my copending application Ser. No. 583,469, filed Sept. 30, 1966, now abandoned.

While various methods have been practiced in the past for laminating plastic foams and polyolefin films, none of such methods has been entirely satisfactory or free from major practical objections or disadvantages. Thus, "flame lamination" as it is commonly called, results in a substantial reduction in thickness of the foam, requires precise production control of operating conditions, and is a relatively expensive procedure. Adhesve lamination, in which an adhesive layer is sandwiched between the foam and polyolefin film, is also relatively difficult and expensive, and "foaming in place," in which liquid polyurethane is placed between polyolefin films and is then foamed and cured, is practical only for comparatively large production runs using the same materials and conditions.

Therefore, it is a main object of the present invention to provide a relatively simple, fast and inexpensive method for laminating plastic foam, particularly polyurethane foam, to a polyolefin film. Another object is to provide a fast and simple laminating method in which the dimensions and appearance of the components are not appreciably altered. Specifically, it is an object to provide a laminating procedure in which the thickness, appearance, and physical properties of the foam layer are not altered by reason of the lamination, and in which the outer surface of the polyolefin film also remains substantially unchanged. Other objects will appear from the specification and drawings in which:

FIG. 1 is a schematic vertical sectional view showing the plastic foam positioned on a vacuum table prior to drawing the film against the upper surface of the foam by vacuum means;

FIG. 2 is a cross-sectional view of a plastic foam having a film applied thereto;

FIG. 3 is a cross-sectional view of a laminated article in which the film is sandwiched between two layers of plastic foam.

A specific embodiment of the invention is illustrated in FIG. 1 in which the basic apparatus consists of a vacuum table member 11 surrounded on its outer periphery by a flange or elevated portion 12 which encloses a plastic foam 13. A polyolefin film 14 held in a perimetrical frame 15 and 15a by screws 15b is heated by any suitable means 16, such as strip heating elements, to its disorientation temperature, and then lowered on to vacuum table 11 where frame 15 comes into contact with flange 12. The area between film 14 and the surface of the vacuum table 11 is evacuated by means of vacuum lines 17 and the film 14 is drawn down onto the surface of foam 13 where it becomes bonded to the surface of the foam. The vacuum is maintained until after the film and foam are securely bonded together.

It should be understood that the laminated foam may be made on a flat surface vacuum table, i.e., one which does not contain an elevated portion or flange.

A laminated article is illustrated in FIG. 2 in which the polyolefin film 14 is bonded to the plastic foam 13 and FIG. 3 the film 14 is sandwiched between two layers of plastic foam 13.

An important aspect of the present invention lies in the discovery that a plastic foam such as polyurethane foam may be bonded to a polyolefin film at a temperature far below the melting or heat-sealing temperature of such film. While any of a number of polyolefin film materials may be used, such as polyethylene, polypropylene, or "Surlyn" (an ionomeric polymer marketed by E. I. du Pont de Nemours & Co., Inc., Wilmington, Del.), such plastic films must all be activated by flame, electrical, or chemical treatment on the surface exposed to the foam. Such treatment as heretofore been characterized by the presence of unsaturation of the surface molecules although more recent studies indicate that such surface is in fact characterized by the substantial elimination of low molecular weight species along the treated surface resulting from cross linking of such species. Whatever may be the correct technical explanation, the surface treatment is itself well known in the art, as set forth in Traver Pat. 3,018,189 and in other patents and publications.

The polyurethane foam may be either rigid or flexible and may be either from polyether or polyester resins. Where the foam and film are to be urged together by vacuum treatment, it is important that such a foam have open or interconnecting cells, or that the foam material be perforated if such cells are normally closed, so that a vacuum may be drawn therethrough.

The term "film" as used herein is intended to include films having a thickness greater as well as less than 0.010 of an inch and, therefore, encompasses plastic sheet materials as well as films. Furthermore, while the invention is of particular utility in applying a polyolefin film to a foam sheet, it is to be understood that the foam body may assume any of a variety of other configurations. For example, where the final article is to be a seat cushion, the foam body may be formed in the shape of the cushion before the thermoplastic covering is applied thereto.

Temperature is critical and, as indicated above, the temperature of the bonding process should be well below the heat-sealing or melting temperature of the plastic film. The most suitable temperature or temperature range will vary depending on the polyolefin employed but, in general, it has been found that such temperature should approximate or slightly exceed the "disorientation" temperature of the film. By "disorientation" temperature, I refer to the temperature at which the oriented film will contract or shrink because of the molecular memory of its composition or, more accurately, because of the relief of internal stresses which are frozen in during the manufacture of the film. Such disorientation temperature is substantially below the heat-sealing temperature range of the polyolefin.

A stretch of polyolefin film, supported by its periphery, undergoes a series of definite physical changes upon heating near or slightly above the disorientation temperature. As heat is applied to such a film, the film first expands because of its co-efficient of expansion. Thereafter, upon reaching the disorientation temperature range, the film contracts because of the relief of internal stresses and, since it is supported by its periphery, becomes taut.

Finally, as heating continues, the film again expands as it is brought to a stage where it is soft beyond a self-supporting condition.

The heat-sealing range for polyethylene is generally regarded as 250–400 degrees F., such range being above the temperature at which a peripherally-supported polyethylene film will begin to sag after the tensioning which previously occurred as the film passed through the disorientation temperature range. For polyethylene, the disorientation temperature range is approximately 175 to 250 degrees F., depending to some extent upon the density of the polyethylene. The preferred range for lamination of the polyethylene film to a plastic foam such as polyurethane foam is approximately 200 to 240 degrees F.

While the term "disorientation temperature" is used herein, it is to be understood that it is not essential to use oriented plastic films in practicing the invention. Non-oriented films or sheets may be used and may be laminated to plastic foams in the same manner as the oriented films and sheets. In both cases, the actual bonding temperatures will be the same but in the latter there will be no actual molecular disorientation.

It has been found that the polyolefin film may, prior to bonding with the foam, comprise a layer of a pre-existing laminate. For example, if the film is polyethylene, it may in fact be a polyethylene coating upon a paper or cloth fabric, or plastic sheet. As previously indicated, it is important that the exposed surface of the polyethylene layer be surface-treated by flame, electrical discharge, or chemical treatment in the manner conventionally employed to make the plastic surface more receptive to inks and other decorative material. Since such treatment is well known in the art, as set forth in Traver Pat. 3,018,189 and in other patents and publications, a more complete description is believed unnecessary herein.

In practicing the method of the present invention, the polyolefin film may be supported in a suitable frame as disclosed in MacDonald Pat. 3,186,895. The supported film is then heated from above until it has passed through its expansion stage and becomes taut as the disorientation temperature is reached and then, while in the disorientation temperature range, the film is brought into contact with the foam surface to be covered. The peripheral edges of the foam may be sealed off in any suitable and conventional manner, and air is evacuated from beneath the film to draw the film tightly against the foam body's upper surface. The extent of negative pressure may be varied considerably and depends to a considerable extent upon the thickness of the film and the intended appearance of the final article. In general, it has been found that a vacuum within the negative pressure range of 1 to 30 inches of mercury is effective.

It is to be understood that means other than vacuum treatment may be used to urge the film and foam together during the laminating process, especially if such process is part of a continuous operation in which webs of foam and film advance through a laminating station. Thus, the force for urging the film and foam together, and for restraining contraction of the film as it is heated to a point within or slightly above its disorientation temperature range, may constitute rollers, platens, or any other suitable means.

Upon cooling, the film and foam will be securely bonded together without any appreciable change in the exposed surfaces of such layers. Thickness of the foam layer is not measurably different from the thickness of the foam body prior to lamination. The exposed surface of the film layer will be substantially the same in appearance as before the lamination, unless for decorative purposes or other reasons a design or pattern is embossed on the film during the lamination process.

In some cases, as where a non-oriented plastic film is used, it may be desirable to place the film and foam into surface engagement prior to heating of the film. The foam thus provides a support for the film as it passes into its state of thermal expansion, and helps to insure a smooth and even application of the film to the foam.

The method of the invention is further illustrated by the following examples:

EXAMPLE I

Laminated articles composed of flexible polyurethane foam, ether grade, and originally oriented polyethylene were prepared as follows: A polyethylene sheet of 0.006 of an inch in thickness was supported by its periphery in a support frame above a urethane foam body of approximately 0.5 of an inch in thickness. The film was heated from above by means of an electric heating coil until it had expanded and then contracted. Upon such contraction, at a temperature estimated to be approximately 200 degrees F., the film was shifted downwardly into contact with the upper surface of the foam and air was then evacuated from beneath the foam to a negative pressure of approximately 5 inches of mercury. Heating of the film was discontinued after the film became taut and was shifted into contact with the foam body.

Close examination of the laminated product following cooling thereof failed to reveal any dimensional change in the foam layer. The layers could not be separated without tearing of the foam, but microscopic examination revealed no significant penetration of the film into the cells of the foam at the interface.

The same procedure as described above was performed with foam sheets of approximately 0.25, 0.75, and 2.0 inches in thickness, and in each instance a secure bonding occurred as described above. In all instances, the foam body retained its original thickness, and the exposed surface of the film retained its original appearance.

In each of the foregoing tests, the polyethylene film was of standard commercial grade and had one surface thereof treated for acceptance of inks or other decorative material. In all instances, the treated surfaces of the films were brought into contact with the foam sheets after heating of the film sections.

EXAMPLE II

A laminated article was prepared in accordance with the method of the present invention as follows: A polyethylene film of 0.004 of an inch in thickness and surface (flame) treated on both sides was laminated to a sheet of flexible urethane foam of approximately 1/32 of an inch in thickness by peripherally supporting the film in horizontal condition in a frame and then heating it from above by means of an electric coil until it expanded and then contracted. Immediately upon such contraction, and at a film temperature estimated to be approximately 200 degrees F., the film was shifted downwardly into contact with the upper surface of the urethane foam. Air was evacuated from beneath the foam to a negative pressure of approximately 7 inches of mercury. At this point, heating of the film was discontinued.

Thereafter, the polyethylene-urethane laminate was supported by its periphery in horizontal condition in the same support frame above a sheet of urethane foam approximately 1½ inches in thickness. The film side of the polyethylene-urethane laminate faced downwardly. The laminate was then heated from above by means of the electric coil until a laminating temperature of approximately 190 degrees to 210 degrees F. was attained. The laminate was then shifted downwardly into contact with the upper surface of the thick foam sheet and air was evacuated from beneath the foam sheet to a negative pressure of approximately 8 inches of mercury. The heating of the laminate was discontinued after the laminate was lowered on to the 1½ inch foam sheet.

The completed laminate therefore consisted of a top layer of 1/32 inch urethane foam, an intermediate layer consisting of 0.004 inch film of polyethylene, and a bottom layer of urethane foam of 1½ inches of thickness. Close examination of the laminate after it had cooled failed to reveal any dimensional change in the several layers, and such layers could not be separated without tearing the foam. As in Example I, microscopic examination revealed no significant penetration of the film into the cells of the foam at the interfaces.

EXAMPLE III

A laminated article composed of flexible polyurethane foam and a film of "Surlyn" brand ionomer resin (an ionomeric olefin copolymer marketed by E. I. du Pont de Nemours & Co., Inc., Wilmington, Del.) was prepared as follows:

A "Surlyn" ionomer resin film of 0.004 inch in thickness was supported by its periphery in a support frame above a urethane foam body of approximately $\frac{1}{32}$ of an inch in thickness. The film was heated by means of an electric heating coil until it had expanded and then contracted. Upon such contraction, at a temperature estimated to be between 170 degrees to 190 degrees F., the film was shifted downwardly into contact with the upper surface of the foam and air was evacuated from beneath the foam to a negative pressure of about 3 inches of mercury Heating of the film was discontinued upon contact between the film and the foam.

As in the prior examples, close examination of the laminate following the cooling period failed to reveal any dimensional changes in the thickness of the layers. The layers could not be separated without tearing of the foam, and microscopic examination indicated no significant penetration of the film into the cells of the foam at the interface.

While in the foregoing I have disclosed the method of the present invention in considerable detail for purposes of illustration, it will be understood by those skilled in the art that many of these details may be varied without departing from the spirit and scope of the invention.

I claim:

1. In a method for laminating a body of plastic foam to a polyolefin film having at least one surface treated to substantially eliminate relatively low molecular weight species therealong, the steps of heating said film to a temperature approximating the disorientation temperature of said polyolefin, and simultaneously urging the treated surface of said film into firm contact with said foam to bond the same securely together.

2. The method of claim 1 in which said polyolefin is polyethylene, said film being heated to a temperature within the range of about 175 to 250 degrees F.

3. The method of claim 2 in which said film is heated to a temperature within the range of about 200 to 240 degrees F.

4. The method of claim 1 in which said film is an ionomeric olefin copolymer.

5. In a method for laminating a body of polyurethane foam to a polyethylene film having at least one surface treated to substantially eliminate relatively low molecular weight species therealong, the steps of heating said film to a temperature approximating the disorientation temperature of said polyethylene, and simultaneously urging the treated surface of said film into firm contact with said foam to bond the same securely together.

6. The method of claim 5 in which said polyethylene film is heated to a temperature within the range of about 175 to 250 degrees F.

7. The method of claim 6 in which said polyethylene film is heated to a temperature within the range of 200 to 240 degrees F.

8. In a method for laminating a body of plastic foam to an oriented polyolefin film having at least one surface thereof treated to substantially eliminate the presence of low molecular weight species therefrom, the steps of supporting said film to restrain the same against contractive forces, heating said film until the same expands and thereafter becomes tensioned, and urging the treated surface of said film into firm contact with said foam when said film is in its heated tensioned state to securely bond said film and foam together.

9. The method of claim 8 in which said polyolefin is polyethylene, said film being heated to a temperature within the range of about 175 to 250 degrees F.

10. The method of claim 9 in which said film is heated to a temperature within the range of 200 to 240 degrees F.

11. The method of claim 8 in which said plastic foam is polyurethane foam.

References Cited
UNITED STATES PATENTS

| | | | |
|---|---|---|---|
| 3,067,082 | 12/1962 | Leigh | 156—84 |
| 3,081,571 | 3/1963 | Dayen et al. | 156—84 X |
| 3,245,863 | 4/1966 | Sonnichsen et al. | 156—84 X |

CARL D. QUARFORTH, Primary Examiner

S. HELLMAN, Assistant Examiner

U.S. Cl. X.R.

156—78, 84, 285